May 15, 1923.

J. A. OLSON

CHUCK

Filed May 20, 1918

Witness:
R. L. Darrington

Inventor,
John A. Olson,
By Glenn S. Noble Atty.

May 15, 1923.
J. A. OLSON
CHUCK
Filed May 20, 1918   2 Sheets-Sheet 2
1,455,351
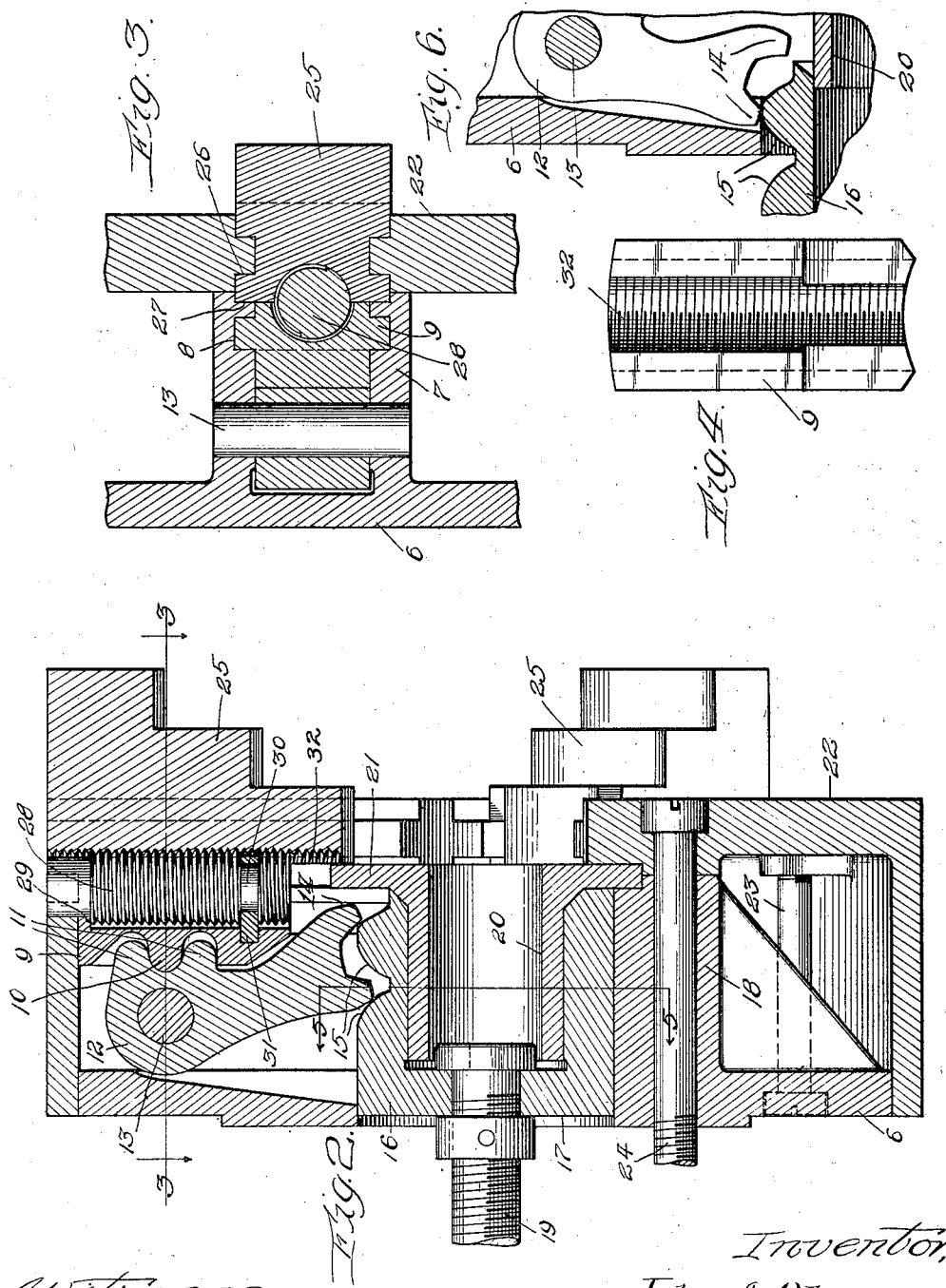
Inventor,
John A. Olson.
By Glenn S. Noble, Atty.
Witness:
R. L. Carrington Patented May 15, 1923.

1,455,351

UNITED STATES PATENT OFFICE.

JOHN A. OLSON, OF CHICAGO, ILLINOIS, ASSIGNOR TO THE S-P MANUFACTURING COMPANY, OF CLEVELAND, OHIO, A CORPORATION OF OHIO.

CHUCK.

Application filed May 20, 1918. Serial No. 235,629.

*To all whom it may concern:*

Be it known that I, JOHN A. OLSON, a citizen of the United States, residing at Chicago, in the county of Cook and State of Illinois, have invented certain new and useful Improvements in Chucks, of which the following is a specification.

This invention relates particularly to pneumatic or fluid operated chucks although certain features thereof may be applicable to chucks of other types.

The objects of the present invention are particularly to strengthen and improve the general construction of pneumatic chucks; to provide a chuck in which the jaws are firmly supported and backed by the body and head; to provide a chuck which will be simple in construction and especially durable and efficient in operation; and in general to provide a chuck having such improved details of construction and improved operating mechanism as will appear more fully from the following description.

In the accompanying drawings illustrating this invention:

Fig. 2 is a longitudinal sectional view;

Fig. 3 is a sectional view taken on the line 3—3 of Fig. 2;

Fig. 4 is a detail of one of the jaws;

Fig. 6 is a detail showing the action of the operating cams.

Figure 1:
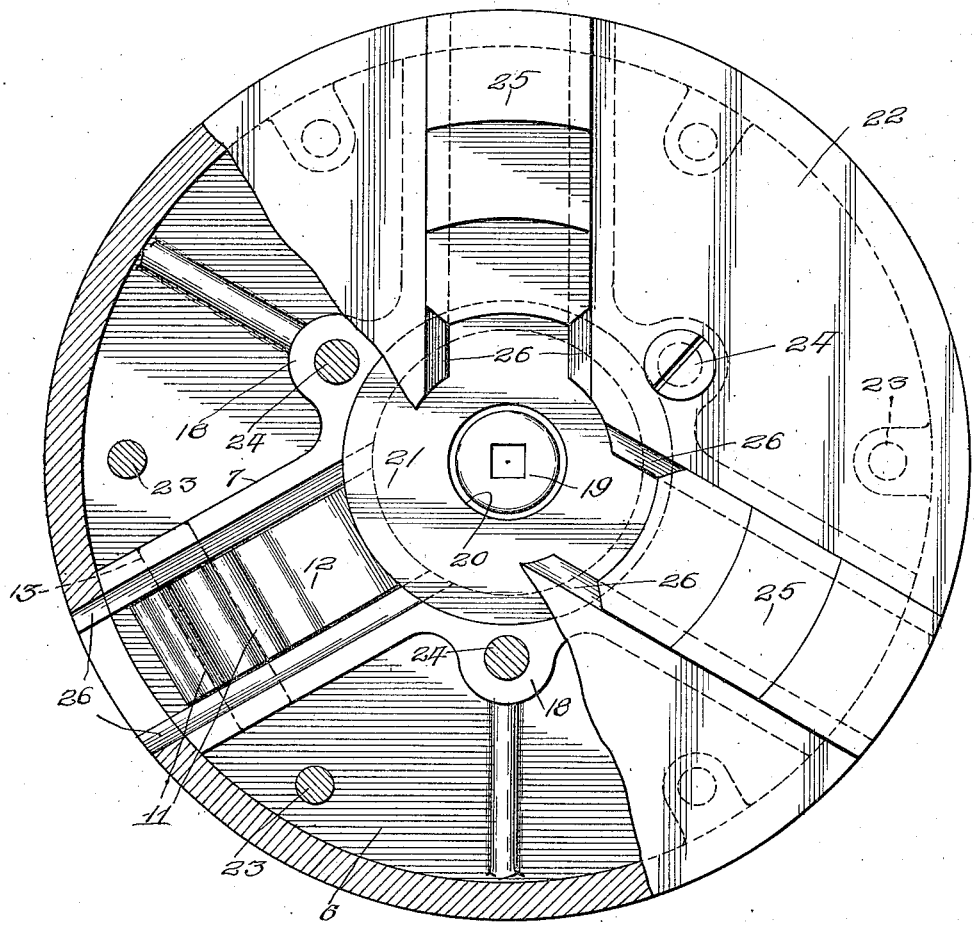
Fig. 1 is a front view of the chuck with a portion of the face plate broken away to show the interior construction.
Figure 5:
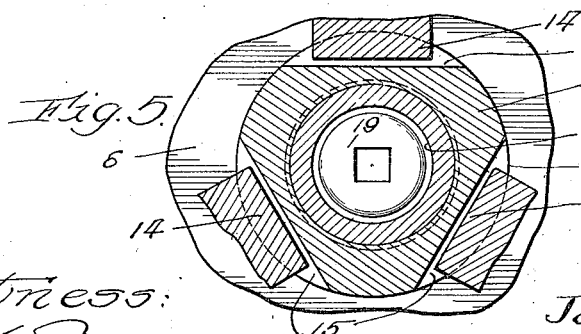
Fig. 5 is a sectional view taken on the line 5—5 of Fig. 2.

In the particular form of chucks shown in these drawings, 6 represents the back plate or head upon which the operating parts are mounted. This plate or head is preferably made circular with ribs or projections formed integrally therewith for supporting the co-acting parts. While these drawings illustrate a three jaw chuck, of course any desired number of jaws may be provided. The ribs or projections 7 are provided with guideways 8 for the slides 9 which are mounted to move radially therein. It will be particularly noted that these ribs form rigid guideways which support the slides throughout their full length, and also throughout the entire travel thereof, thereby making an exceedingly rigid and substantial construction. These slides are provided with one or more teeth 10 which are engaged by the teeth or projections 11 of the gear segments or bell-crank levers 12. These levers fit closely between the pairs of ribs 7 and are pivotally mounted on pins 13. The opposite ends of these levers are provided with one or more teeth or projections 14 which engage with the cams of progressively changing pitch 15, on a cylindrical segmental rack or cam member or bushing 16, which is reciprocably mounted in a guideway 17 in the center of the plate 6. This guideway is formed by an opening through the plate 6 and through a substantially cylindrical lug or projection 18 which connects the inner ends of the ribs 7. This cylindrical projection further tends to strengthen the back plate and add to the rigidity of the structure. The cam member 16 is reciprocated by means of a draw rod or bolt 19 which is connected at one end to the head of the rack or cam member 16 and at the other end to the piston of the operating cylinder or other device (not shown). A dust sleeve or bushing 20 fits within the cam member 16 and is provided with a flange 21 which engages with the outer end of the cylindrical projection 18, and serves to prevent dirt or the like from interfering with the operating parts.

The chuck body 22 is made in the form of a cover to fit over the plate 6 and parts connected therewith, and is secured to the plate by means of bolts or screws 23. The entire chuck is secured to the head of a lathe, or to such other machine to which it may be applied, by bolts or screws 24 which project through the head and the body, as shown in Fig. 2.

The jaws 25 are mounted in guideways 26 which are formed partly in the face of the body 22 and partly in the adjacent faces of the ribs 7, so that the inner faces 27 of these jaws travel on and are supported directly by the ribs. It will also be noted that they engage directly with the slides 9, the whole forming an exceedingly compact and substantial construction. The jaws are adjusted with respect to the slides 9 by means of adjusting screws 28. The outer ends of these screws are shouldered to engage with bearings 29 in the slides 9 and they are cut away adjacent to their inner ends to form reduced portions 30 which engage with bearing rings 31 inserted in slots in the slides 9. The jaws are threaded as indicated at 32 to engage with the screws whereby the jaws will move out or in as the screws are turned.

The operation of this improved chuck will be readily apparent to those familiar with such devices. As the cam member or bushing 16 is drawn inwardly, or to the left, as shown in Fig. 2, the several bell-cranks or operating members 12 will be actuated and will draw the slides 9 toward the center of the chuck to cause the jaws 25 to engage with the work piece. When the cam member or bushing 16 is again moved to the right, the jaws will be forced outwardly to release the work piece.

The action of the cams during the clamping movement forms one of the particularly desirable features of this invention. It will be noted that, as the cam member 16 moves to the left, the cams will cause the bell-crank levers to move comparatively rapidly during the first portion of the stroke, and then the relative movement is decreased, but the resultant clamping force is increased as the teeth or projections ride up on the cams. The arrangement may be such, as shown in Fig. 6, so that when the tooth or projection arrives at the top of the cam, the bell-crank lever will be locked in clamping position so that the work will be held even if the air is released or the air pressure diminished. If the jaws are to be moved outwardly, the opposite or left hand cams will act in a corresponding manner against the opposite faces of the teeth or projections on the bell-cranks. While I have shown the cams as being formed in a particular manner in order to co-act with the operating levers, I consider the use of cams in this connection as being a novel feature, and desire to protect generally the use of cams in such combinations for operating clamping jaws.

It will be observed that changes may be made in the arrangement of parts and details of construction without departing from the scope of this invention, and therefore I do not wish to be limited to the exact construction herein shown and described, except as specified in the following claims, in which I claim:

1. A chuck comprising a solid back plate having a central apertured projection, pairs of radially arranged ribs extending outwardly from said projection, a longitudinally slidable cam member mounted in said aperture, bell-crank levers pivotally mounted between the ribs and having their inner ends engaging with the cams on said cam member, guideways formed in said ribs, and slidable clamping members mounted in said guideways and engaging with the opposite ends of said levers and adapted to be reciprocated thereby.

2. A chuck member comprising a solid circular back plate having a plurality of radially arranged integrally formed projections provided with guideways for receiving the clamping members.

3. In a chuck, the combination of a solid back plate having a plurality of integrally formed guide members projecting therefrom, guideways in said members, work clamps slidably mounted in said guideways, and means for actuating said clamps.

4. The combination of a back plate having a plurality of radially arranged guideways formed integrally therewith, slides mounted in said guideways, means for moving said slides inwardly and outwardly, a body fitting over and enclosing said guideways, radial guideways formed in said body in alinement with the first named guideways, jaws mounted in the guideways of the body and also engaging with the first named guideways, and adjusting screws mounted in said slides and co-acting with said jaws.

5. In a chuck, the combination of a back plate having a central cylindrical projection, and having radially arranged pairs of ribs extending outwardly from said projection, slidable cams mounted in said projection, levers pivotally mounted between the ribs of the respective pairs, a flanged body fitting over said ribs and plate, guideways formed in said ribs and body, and adjustable clamping members mounted in said guideways and engaging with the opposite ends of said levers, whereby when the cams are reciprocated, the clamping members will be moved inwardly and outwardly.

6. In a chuck, the combination of a plate having an apertured projection, a hollow cam member fitting in said projection, a flanged dust bushing engaging with said projection and fitting in said member, pairs of radially arranged ribs extending outwardly from said projection, a flanged cover fitting over said ribs and plate, guideways formed in said cover and ribs, slides mounted in said guideways, levers pivotally mounted between the ribs of the respective pairs and co-acting with said cam and slides for actuating the latter, adjusting screws mounted in said slides, and clamping jaws mounted in said guideways and having threaded recesses for engagement with said screws.

7. In a chuck, a back plate, a hollow body mounted thereon, a dust sleeve extending inwardly into an axial opening of the body, a segmental rack member longitudinally reciprocable on the sleeve within the body, jaw slides reciprocable in the body toward the dust sleeve mouth, a set of gear segments pivoted on the back plate within the body, each having segmental teeth in mesh with mating teeth on the companion jaw slides and another set of teeth of different radius in mesh with the companion rack segment, a head secured at the inner end of the rack member and means extending from the head through a central opening of the back plate for reciprocating the rack member.

8. In a chuck, a back plate and body thereon having aligned openings, a dust sleeve lining the body opening and extending toward the back plate opening, a segmental rack member reciprocable on the sleeve within the body, a head secured to the inner end of the rack member and provided with a pull screw extending through the back opening, a set of jaw slides reciprocable in the body toward the sleeve and gear segments each journalled on the back plate within the body and provided with one set of teeth in mesh with mating teeth on the companion jaw slide and a second set of teeth of different pitch diameter engaging with a companion rack segment of the rack member.

9. A chuck comprising a hollow body; jaw slides in the body; levers, having integral projections at either end, enclosed within the body; each lever engaging an adjacent jaw slide at one end; and means for actuating the said levers and jaw slides, said means comprising a cylindrical member reciprocably within the said body, and having on its exterior surface a plurality of circumferentially spaced chordal projections, each chordal projection being adapted to engage directly with two projections of an adjacent lever.

10. A chuck comprising a hollow body; jaw slides in the body; levers having integral projections at each end, enclosed within the body; each lever engaging an adjacent jaw slide at one end; and means for actuating the said levers and jaw slides; said means comprising a cylindrical member reciprocable within the said body, and having on its exterior surface a plurality of circumferentially spaced projections, each formed with cam surfaces of progressively changing pitch, and each projection being adapted to mesh with and engage two projections on an adjacent lever.

11. A chuck comprising a hollow body; jaw slides in the body; jaw actuating levers enclosed within the body; projections on opposite ends of the levers; and a cylindrical member mounted for reciprocal movement in the said hollow body, the said member having circumferentially spaced projections on the exterior thereof, each projection meshing with two projections on an adjacent lever, and each projection on the cylindrical member having a cam surface of progressively decreasing pitch from its base toward the outer extremity thereof, and terminating in a flattened surface, whereby the rate of movement of the jaw slides toward their work holding position progressively decreases and finally ceases during a substantially uniform rate of movement of the cylindrical member in one direction.

12. A chuck comprising a hollow body; jaw slides in the body; jaw actuating levers enclosed within the body; integral projections on opposite ends of the levers; and a cylindrical member mounted for reciprocal movement in said hollow body, the said member having circumferentially spaced projections on the exterior thereof, each meshing with two projections of an adjacent lever, and each projection having a cam surface terminating at its outer extremity in a flattened surface; the levers, jaw slides and cylindrical member being so positioned with respect to one another that when the jaw slides are at substantially the clamping end of their stroke, one projection of the levers will directly and frictionally engage with the said flattened surfaces of the projections.

JOHN A. OLSON.